(12) United States Patent
Risi

(10) Patent No.: US 8,091,952 B2
(45) Date of Patent: Jan. 10, 2012

(54) HARDWOOD TRUCK FLOORING WITH WOOD PRESERVATIVES

(75) Inventor: Benoir Risi, Cap St-Inace (CA)

(73) Assignee: Prolam, Societe en Commandite, Cap St-Ignace, QC (CA)

( * ) Notice: Subject to any disclaimer, the term of this patent is extended or adjusted under 35 U.S.C. 154(b) by 270 days.

(21) Appl. No.: 12/234,423

(22) Filed: Sep. 19, 2008

(65) Prior Publication Data

US 2009/0102232 A1 Apr. 23, 2009

Related U.S. Application Data

(60) Provisional application No. 60/960,185, filed on Sep. 19, 2007, provisional application No. 61/067,096, filed on Sep. 20, 2007.

(51) Int. Cl.
*B32B 3/00* (2006.01)

(52) U.S. Cl. .................................................. 296/184.1

(58) Field of Classification Search ............... 296/184.1, 296/191, 193.07, 183.2; 52/515, 517; 105/422; 410/121, 155, 156
See application file for complete search history.

(56) References Cited

U.S. PATENT DOCUMENTS

| | | | |
|---|---|---|---|
| 1,612,102 A | 12/1926 | Drefahl | |
| 2,031,973 A | 2/1936 | Mudge | |
| 2,047,170 A | 7/1936 | Asplund | |
| 2,060,164 A * | 11/1936 | Bonsall | 105/422 |
| 2,907,684 A | 10/1959 | Partansky | |
| 3,416,933 A | 12/1968 | Nicholson et al. | |
| 3,928,677 A | 12/1975 | Anthony | |
| 4,323,602 A | 4/1982 | Parker | |
| 4,518,394 A | 5/1985 | Templin | |
| 4,612,255 A | 9/1986 | Hein | |
| 4,685,720 A * | 8/1987 | Oren et al. | 296/184.1 |
| 4,971,840 A | 11/1990 | Boho et al. | |
| 6,596,063 B2 | 7/2003 | Rettenbacher et al. | |
| 6,821,631 B2 | 11/2004 | Grantham et al. | |
| 7,264,886 B2 | 9/2007 | Cui et al. | |
| 7,297,193 B1 | 11/2007 | Ashmore et al. | |
| 7,637,558 B2 * | 12/2009 | Risi | 296/184.1 |
| 2002/0189491 A1 | 12/2002 | Rettenbacher et al. | |
| 2003/0104135 A1 * | 6/2003 | Grantham et al. | 427/397.8 |
| 2007/0037001 A1 | 2/2007 | Gao et al. | |

FOREIGN PATENT DOCUMENTS

| | | |
|---|---|---|
| DE | 10 2004 020 729 | 11/2004 |
| EP | 0 326 919 | 8/1989 |
| GB | 2 233 677 | 1/1991 |
| JP | 55-64502 | 5/1980 |

(Continued)

OTHER PUBLICATIONS

Diesel Truck Resource.com, Scotty, Dec. 2005 (http://www.dieseltruckresource.com/dev/kind-wood-my-g-n-trailer-floor-t85580.html).*

*Primary Examiner* — Stephen Gordon

(74) *Attorney, Agent, or Firm* — Merchant & Gould P.C.

(57) ABSTRACT

A hardwood floor used for making trailers in the transportation industry is treated, at least for a portion thereof, with a water-based wood preservative. The preservative is preferably a borate-based preservative. When the floor is provided with a steel plate at a rear thereof, the wood preservative located in the vicinity of the steel plate prevents the formation of fungi and increases the useful life of the floor.

5 Claims, 2 Drawing Sheets

FOREIGN PATENT DOCUMENTS

| | | |
|---|---|---|
| JP | 58-042411 | 3/1983 |
| JP | 4-319401 | 11/1992 |
| JP | 5-237813 | 9/1993 |
| RU | 2 103 163 | 1/1998 |
| WO | WO 03/037532 A1 | 5/2003 |
| WO | WO 2005/097443 A2 | 10/2005 |

* cited by examiner

HARDWOOD TRUCK FLOORING WITH WOOD PRESERVATIVES

This application claims benefit of U.S. Application Ser. No. 60/960,185, filed 19 Sep. 2007, and U.S. Application Ser. No. 61/067,098, filed 20 Sep. 2007 and which applications are incorporated herein by reference. To the extent appropriate, a claim of priority is made to each of the above disclosed applications.

FIELD OF THE INVENTION

The present invention relates to an improved laminated wood flooring for truck trailers, truck bodies and containers. The invention is a wooden laminated floor where a partial or total area of the floor is treated with a wood preservative, or a wood preservative and a water repellent, which have been applied by painting or brushing.

In particular, a waterborne preservative using inorganic borates and/or a waxed water repellent are used to protect the wood from fungus attack and wood decay, when the wooden laminated floor is used under a threshold plate at the back of the trailer or container near the doors.

BACKGROUND OF THE INVENTION

Hardwood-based laminated wood flooring is a popular product used in truck trailers because of its performance and the many advantages it offers. The surface characteristics of hardwoods such as high wear resistance and slip resistance are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and the ability to absorb small amounts of water, oil or grease without significantly affecting slip resistance are yet additional favorable properties of hardwood flooring.

The hardwood-based laminated floor unfortunately also suffers some disadvantages. Under proper and normal conditions, a hardwood laminated floor has a life expectancy of 10, 15, and even 20 years of good service. However, if conditions exist, the development of wood-degrading organisms, like fungi, can also occur and the floor will eventually fail prematurely.

The existence and development of rot caused by fungus in laminated wood trailer flooring depends on the moisture conditions of the wood. Wood decay only occurs when the moisture content of the wood is above the fiber saturation point (usually between 25% to 30%). It is recognized by the wood industry that wood having a moisture content below 20% will not decay. In normal conditions, the moisture content of a laminated wood floor in the United States will vary between 12% to 17%. At this moisture level, decay will not form.

Most problems with decay on a laminated wood trailer floor or container will occur at the back of the trailer or the container, near the rear doors. Because the trailer doors are often open in that area, the floor is exposed to outside conditions. The outside conditions by themselves are not a problem: it is not because it rains on a wooden floor, that the wood will automatically develop fungus. The problem is more related to the design of the trailer or the container. In some trailers or containers, a threshold plate made of a steel diamond plate, which covers the first 1 to 4 feet of the wooden floor is often used. The threshold plate's purpose is to protect the wood floor from the impact of a fork lift when it enters the trailer. The threshold plate also to protects and reinforces the wooden floor at the rear of the trailer.

The problem with the threshold plate is that when it rains (or snows) and the rear doors are open, the water travels over the top of the threshold plate and ingresses between the edges of the steel plate and the wooden floor. The water stays trapped and cannot evaporate because of the threshold plate covering it. Thus, the moisture in the wood starts to increase until it reaches a level where fungus starts to grow, and decay will eventually form. FIG. 1 shows an 11 year old laminated oak floor with severe fungus attack and wood rot. Of course, FIG. 1 shows a floor with the steel diamond plate removed.

Some solutions have been proposed to combat this problem. Pressure treatments using oxide copper (like copper-8) have been used to protect the wooden floor from fungi and wood decay. This method is very effective but also very expensive (50 to 75 cents per square foot). However, because of environmental concerns, this product can no longer be used.

Some trailer manufacturers have changed the design of their trailers and are no longer using hardwood flooring for the first 2-3' of floor at the rear. Instead, they use a metal structure with no wood underneath. This solution is also very expensive, and increases the weight of the trailer and reduces the load capacity of the trailer.

SUMMARY OF THE INVENTION

The present invention consists in using a wood preservative which will prevent the fungus from occurring, reducing the risk of decay. Preferably, the wood preservative is applied locally, at the area where the threshold steel plate will be installed. The treatment can be done during the manufacturing process of the laminated hardwood floor or during the manufacturing process of the trailer, but in all cases before the installation of the threshold steel plate.

In accordance with one aspect of the invention, there is provided a hardwood truck floor, said floor having a front, a rear, a length and a width, said floor comprising:
  a plurality of boards, each board having a length corresponding to said length of a trailer and a width, said floor including a plurality of boards arranged side by side to form said width of said floor, each of said boards being made of a plurality of wood strips arranged end to end and side by side;
  at least a first portion of said floor on a top surface thereof being provided with a wood preservative at said rear of said floor, said wood preservative being water based and borate based; and
  a steel plate fastened over a second portion of said floor on said top surface, said second portion of said floor being equal to or less than said first portion.

BRIEF DESCRIPTION OF THE DRAWINGS

The present invention will be better understood after having read a description of a preferred embodiment thereof, made in reference to the following drawings in which.

DESCRIPTION OF A PREFERRED EMBODIMENT OF THE INVENTION

Figure 1:
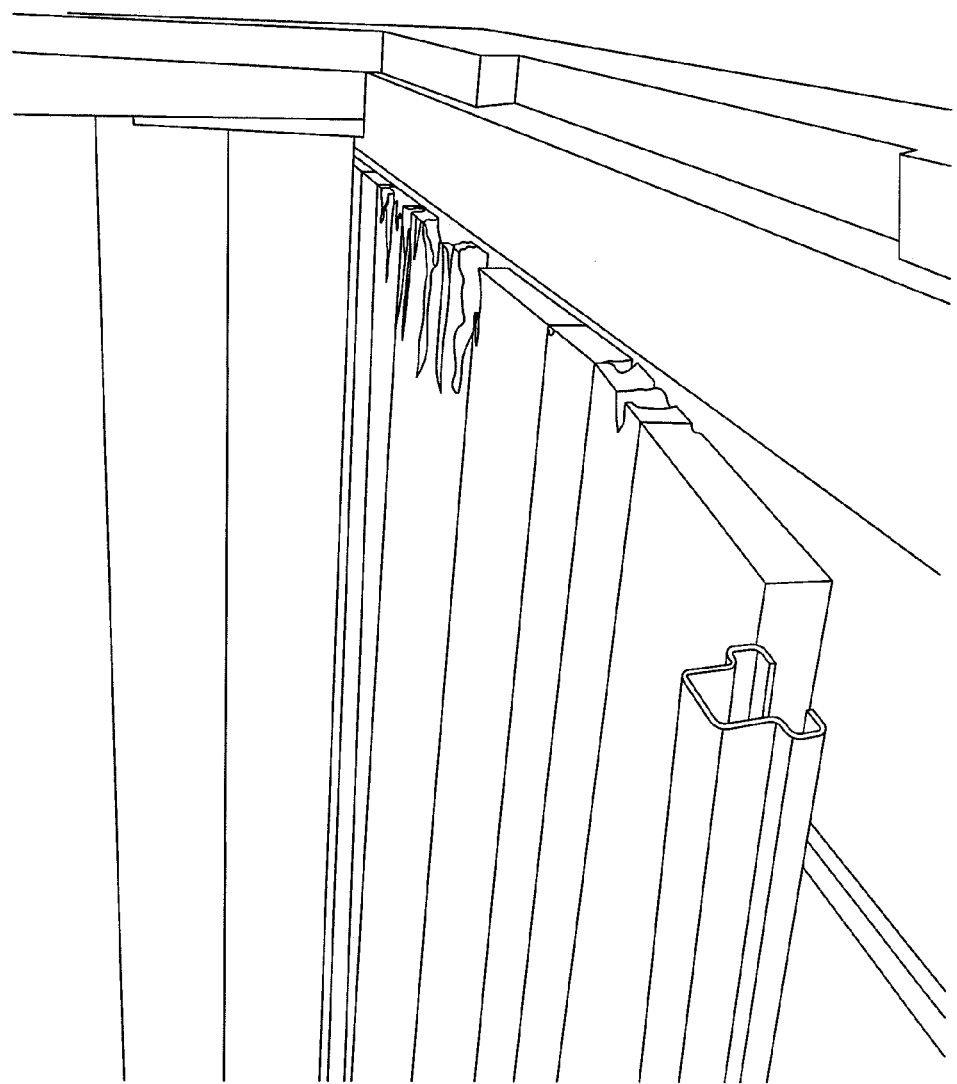
FIG. 1 (prior art) shows a hardwood floor exhibiting signs of fungus.
Figure 2:
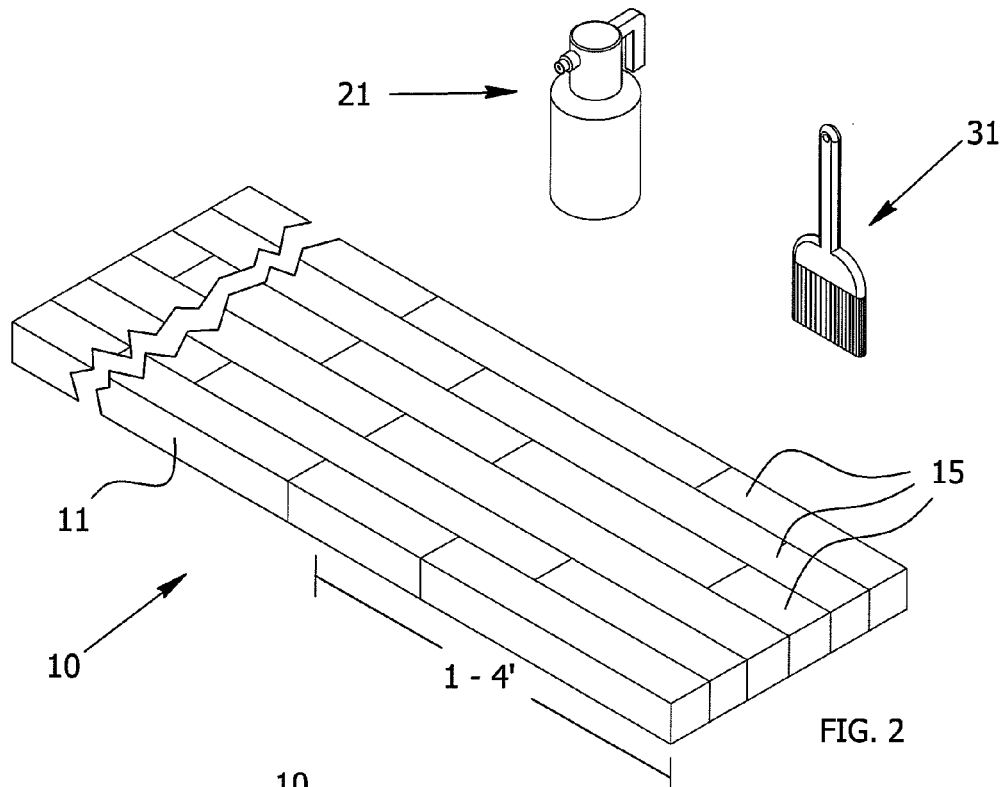
FIG. 2 is a schematic representation of a portion of a wood floor during the application of the wood preservative according to a preferred embodiment of the invention.
Figure 3:
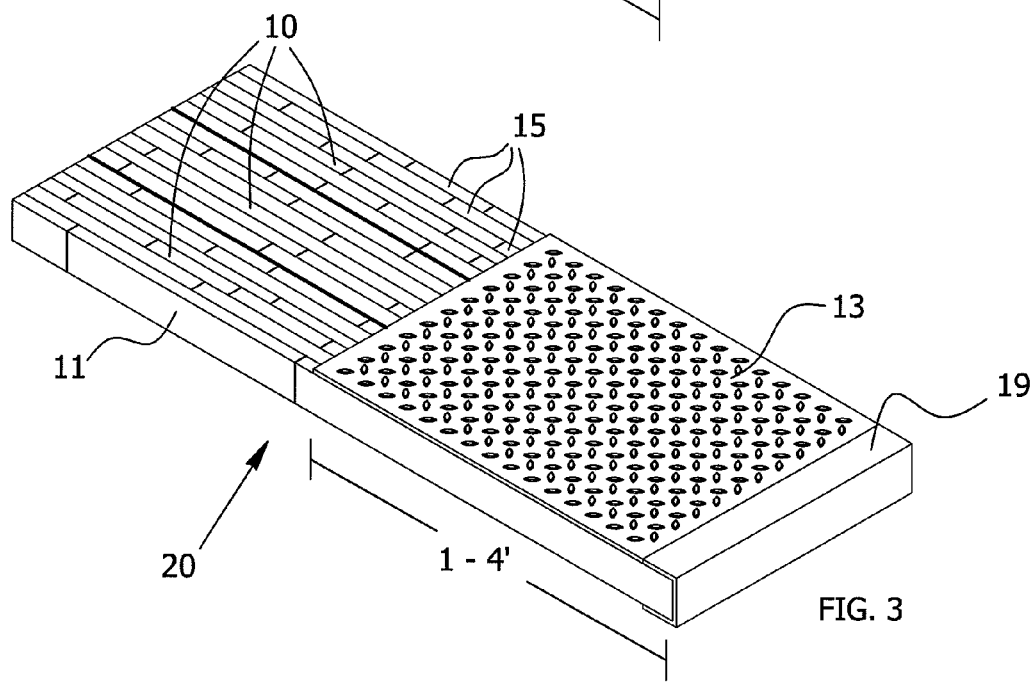
FIG. 3 is a schematic representation of a portion of a wood floor treated according to the process according to a preferred embodiment of the invention, with a steel plate provided on a top surface thereof.

As mentioned above, the present invention is useful in the field of hardwood truck floors 20. Such floors are made of a plurality of planks 10, arranged side by side to form the floor. Each plank is made of a number of strips 15 arranged end to end and side by side. Such hardwood floors are well known in the art, and their construction and features will not be expanded upon further.

As mentioned previously, some of these hardwood floors are further provided with a steel plate 13, usually a steel diamond plate, placed at the rear of the floor. This steel plate can cover the first 1 to 4 feet of the floor (calculated from the rear, of course).

In most trailers of the type referred to above, the end of the floor at the end is inserted into a U-shaped beam 19. The beam forms part of the frame for the doors of the finished trailed. It will be appreciated that even though a steel plate may not be present on the floor, the portion of the floor which is inserted into the U-shaped is treated according to the principles of the present invention.

The invention lies in impregnating a portion or all of the wood floor with a wood preservative which will prevent or retard the formation of fungi in the wood, thereby increasing the useful life of the floor.

There are many types of wood preservatives. They can be divided into two (2) types of general classes: the oil-borne preservative and the water-borne preservative.

Because of the high level of toxicity to humans, the oil-borne preservative should be avoided in a trailer or container application. Water-borne preservatives are applied as water solutions. Several formulations exist with different combinations of arsenic, copper, chromium, etc. In the case of trailer floors or containers, waterborne preservatives using borate are preferable.

Borate preservatives, unlike other wood preservatives, are non-volatile, odorless, and, for humans, less toxic than table salt. They do not discolor the wood, are non-corrosive, environmentally safe and known to be effective in controlling different species of wood decaying fungi.

Because a water solution with borate can be sprayed or brushed on, it allows the production of the floor according to the present invention to remain efficient and low-cost (approximately 2 to 5 cents per square foot).

Preferably the following borate preservatives can be used: sodium octaborate, sodium tetraborate, sodium pentaborate and boric acid, and preferably be 98% pure or more.

The borate preservatives are dissolved in water, preferably in a concentration of one part borate for three parts of water. To maximize the protection of the wood, the quantity of borate is preferably between 0.0022 and 0.0044 pounds per square foot of wood.

Since the borate preservatives can be dissolved in water, they exhibit a tendency to leach. The borates preservative usually do not fix to the wood and so, when the treated wood is exposed to heavy rain, the borate will not stay fixed to the wood, leaving the wood with less protection. Although this disadvantage of borate preservatives is known, the laminated hardwood floors of trailers or containers are not exposed directly to outside conditions, even at the back area near the rear doors. The threshold plate protects the treated wood from direct exposure of the outside condition. The moisture content of the wood increase slowly, in correlation with the quantity of water which goes underneath of the threshold plate. The borates, which are at very near surface of the wood, will now go deeper into the wood as the wood is absorbing the moisture into it. Thus, the disadvantage of borate preservatives usually known in typical applications here exhibits an unexpected feature, if not an actual advantage.

To fix the borate to the wood, a mixture of water with borate and wax can be used. It should be understood here that mixture does not necessarily mean that the water, borate and wax are mixed together. It also includes the situation where the water and borate are mixed and then applied to the wood. Following this, the wax is applied to the wood. In this sense, the borate mixture and the wax will mix together. The wax will help the borate to affix itself to the wood and also to act as a water repellent.

A water repellent with wax on it, for example, can be also used to protect the wood from decay. The water repellent will help the wood to not absorb moisture when the wood is exposed to water. The moisture content of the wood is more stable and stays below the critical 20%, where development of decay will not occur.

In the past several solutions have been tried to prevent decay on the wooden floor which is under a threshold plate at the back of the trailer or containers like pressured treated wood with a solution of oxide copper or new designed trailer where using a steel structure without wooden floor at the back of the trailer.

Those solutions are either expensive, difficult to apply or not environmentally friendly.

The present invention offers an innovative, efficient and inexpensive way to prevent development of fungus which will eventually make the wooden floor decay. It provides a solution to a problem which has been present for several years in the transport industry.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A hardwood truck floor, said floor having a front, a rear, a length and a width, said floor comprising:
    a plurality of boards, each board having a length corresponding to said length of a trailer and a width, said floor including a plurality of said boards arranged side by side to form said width of said floor, each of said boards being made of a plurality of wood strips arranged end to end and side by side;
    a first portion of said floor on a top surface thereof being locally and exclusively provided with a wood preservative at said rear of said floor, said wood preservative being water based and borate based; and
    a steel plate fastened over a second portion of said floor on said top surface, said second portion of said floor being equal to or less than said first portion;
    wherein said first portion of said floor is less than or equal to four feet of said floor as measured forwardly from a rear edge of said floor.

2. A floor according to claim 1, wherein said borate based preservative is selected from the group of sodium octaborate, sodium tetraborate, sodium pentaborate and boric acid.

3. A floor according to claim 2, wherein a purity of said borate based preservative is greater than 98%.

4. A floor according to claim 1, wherein said borate based preservative is dissolved in water prior to application on said floor, a concentration of said preservative being of one part borate to three parts water.

5. A floor according to claim 1, wherein said floor is provided with between 0.022 and 0.044 pounds of borate per square foot.

* * * * *